US006035506A

United States Patent [19]

Bowen

[11] Patent Number: 6,035,506

[45] Date of Patent: Mar. 14, 2000

[54] FUEL INJECTOR REMOVER

[76] Inventor: Joe Bowen, 564 CR 149, Okolona, Miss. 38860

[21] Appl. No.: 09/083,127

[22] Filed: May 22, 1998

[51] Int. Cl.[7] .......... B23P 19/04

[52] U.S. Cl. .......... 29/259; 29/264

[58] Field of Search .......... 29/259, 260, 264

[56] References Cited

U.S. PATENT DOCUMENTS 1,513,031 10/1924 Brown .......... 29/259

*Primary Examiner*—Timothy V. Eley

*Assistant Examiner*—Benjamin M. Halpern

[57] ABSTRACT

I have invented a device for removing a fuel injector from the engine block of an internal combustion engine that comprises a support member having a cylindrical channel passing through said support member, a threaded rod that includes a first lug nut fitted onto one end of said rod in a manner that supports said first lug nut and allows the rod to turn without turning said first lug nut, said threaded rod inserted through said channel in said support member, a second lug nut screwed over and onto the other end of said rod in a manner that prevents removal of said rod from said support member, and said first lug nut provided with internal threads capable of mating with the threads provided on a fuel injector.

1 Claim, 2 Drawing Sheets

FIG. 3b
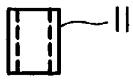
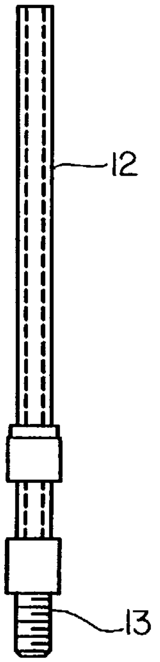
FIG.3c
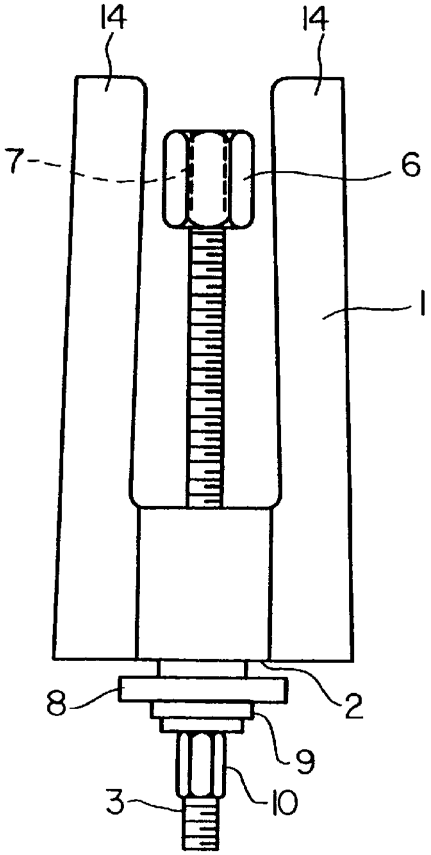
FIG.3a

FUEL INJECTOR REMOVER

SUMMARY

Fuel injectors often become stuck in engine cylinder heads during use. When it is necessary to remove a fuel injector that has become stuck in a cylinder head, a great deal of force may be required to remove that stuck fuel injector from the cylinder head. The most common method of removing a stuck fuel injector entails unscrewing the cap from the fuel injector exposing its threaded end, screwing onto the exposed threads of the fuel injector a device comprising a rod on which a sliding hammer is mounted, which hammer is designed to create force by the inertia of movement of the hammer along a rod followed by abruptly transmitting its force to a plate at the other end of the rod opposite its attachment to the fuel injector, in the hope of dislodging the stuck fuel injector by the jerking force transmitted along the rod. An example of that method and a means used to perform that method is described in U.S. Pat. No. 3,739,452 issued to Gadberry on Jun. 19, 1973.

The means and method described by Gadberry has several disadvantages. The force applied by Gadberry depends upon the force applied to the hammer by the mechanic. After several unsuccessful tries, the arm of the mechanic will tire unnecessarily. The violent impact of Gadberry's hammer can produce undesireable stress on the engine block, as well as on the mechanic. And, too much space is required to enable a mechanic to slide Gadberry's hammer the required distance to develop the necessary force on impact.

More importantly, the use of Gadberry's hammer, or his alternative lifting bar, creates a force that usually strays from a line along the centerline of the stuck fuel injector, tending to crimp or bend the fuel injector within the cylinder head, often making it more difficult to remove. A better method of removal is to gradually apply a lifting force of significant mechanical advantage substantially along the centerline of the stuck fuel injector until the fuel injector becomes unstuck.

I have overcome the difficulties inherent in Gadberry's method by inventing a device for removing a fuel injector from the cylinder head of an internal combustion engine that comprises a support member having a cylindrical channel passing through said support member, a threaded rod that includes a first lug nut fitted onto one end of said rod in a manner that supports said first lug nut and allows the rod to turn without turning said first lug nut, said threaded rod inserted through said channel in said support member, a second lug nut screwed over and onto the other end of said rod in a manner that prevents removal of said rod from said support member, and said first lug nut provided with internal threads capable of mating with the threads provided on a fuel injector.

My fuel injector remover aligns the force applied to the stuck fuel injector alone the centerline of the stuck fuel injector, eliminating crimping or bending of the fuel injector in the engine block during the process of its removal. And, my process of removing a stuck fuel injector uses the gradual application of greatly leveraged force applied against the stationary cylinder head, gently pulling the stuck fuel injector out of the cylinder head without creating the undesirable stresses created by Gadberry's impact method.

DESCRIPTION OF THE DRAWINGS

FIG. 3*a* is a two-dimensional side view of my fuel injector remover shown assembled and ready for attachment to a fuel injector to remove said fuel injector from said cylinder head.

FIG. 3*b* is the side view of the cap of a fuel injector shown removed from the fuel injector by unscrewing the threaded portion of said cap shown in dotted lines from the top of said fuel injector.

FIG. 3*c* is the side view of a fuel injector from which its cap has been removed showing the threads onto which the threaded portion of the first lug nut is to be screwed to secure the fuel injector remover to the fuel injector to enable removal of the fuel injector from the cylinder head.

DETAILED DESCRIPTION

Figure 1A:
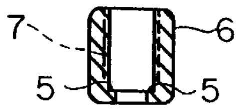
FIG. 1*a* is cross sectional view of a lug nut provided with an internal shelf and internal threads.
Figure 1B:
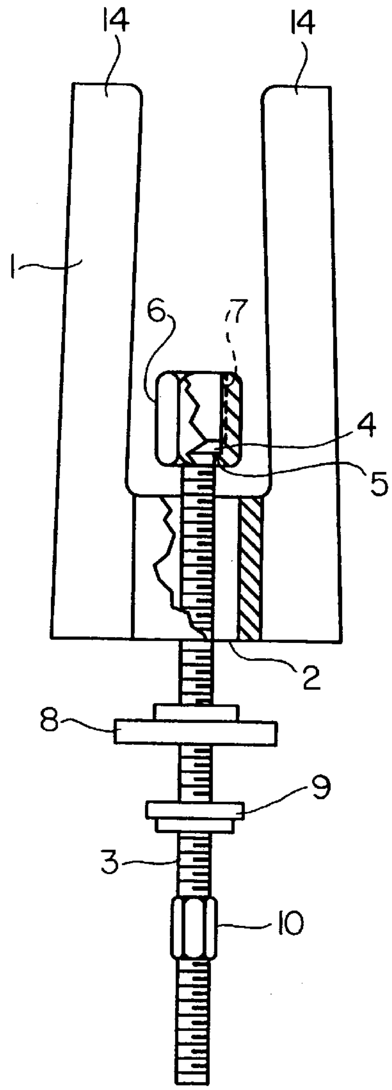
FIG. 1*b* is a two-dimensional side view of my fuel injector remover that shows its support member, threaded rod inserted through the channel provided through said support member, said rod having the lug nut shown in FIG. 1*a* fitted to one end of said rod and a second lug nut screwed onto the other end of said rod.

As shown in FIG. 1*b*, the support member 1 of my fuel injector remover may be made of any suitable material, such as cast iron or steel. It preferably is made in the shape of the letter "U" with both of its legs of substantially the same length. The saddle or bridge of the "U" shaped member is provided with a substantially cylindrical channel 2 through which threaded rod 3 may be inserted. Support member 1 may be cast with channel 2 already formed during the casting step, or support member 1 may be fabricated as a solid piece of material, and channel 2 drilled out of the solid support member 1.

Figure 2:
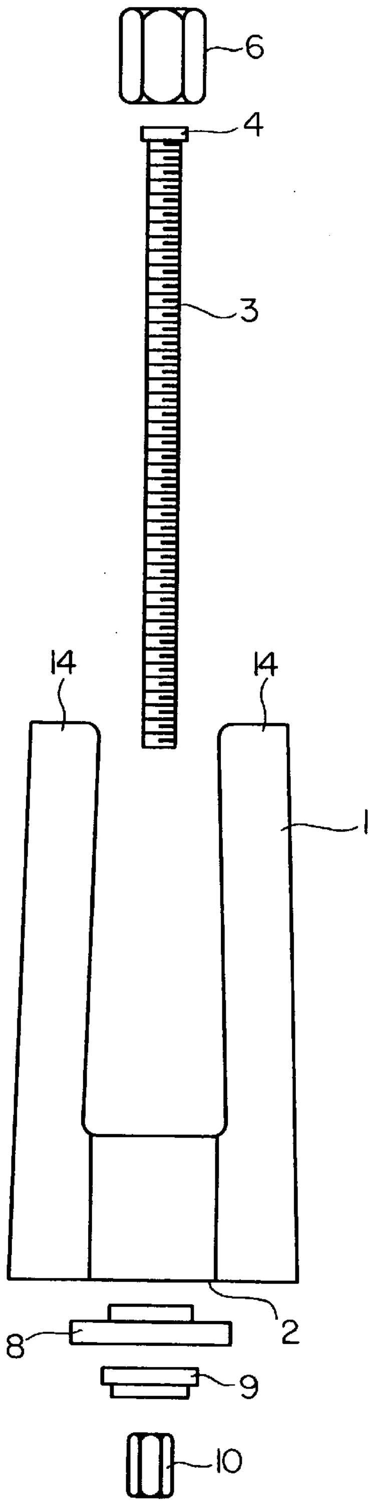
FIG. 2 is an exploded side view of my fuel injector remover that shows its component parts aligned along a common center line prior to the assembly of those parts to comprise my fuel injector remover.

As shown in FIG. 2, threaded rod 3 is made in the form of an elongated bolt and provided with rod head 4 at one of its ends. Threaded rod 3 may be made out of any suitable material, such as steel, so long as it is capable of assuming sufficient stress to remove a stuck fuel injector without breaking or having its threads stripped.

Rod head 4 must necessarily be of greater diameter than threaded rod 3 to retain threaded rod 3 on shelf 5 of first lug nut 6, shown in FIGS. 1*a* and 1*b*. First lug nut 6 may be made out of any suitable material, such as steel, that is strong enough to support rod head 4 without breaking or having threads 7 stripped during the process of removing a stuck fuel injector. In addition, several first lug nuts 6 may be made in every different size necessary to fit every different size of fuel injector, and those different sized first lug nuts 6 may be interchanged, as desired, so that the fuel injector remover can be made to fit and remove any size fuel injector.

FIG. 2 shows a washer 8 and a thrust bearing 9 of different diameters that may be used to reduce the diameter of channel 2 to better align the center line of threaded rod 3 with the center line of a stuck fuel injector. FIG. 2 shows second lug nut 10 as a separate part of my fuel injector remover. Second lug nut 10 is shown in FIGS. 1*b* and 3*a* as screwed onto and over the end of threaded rod 3 opposite the end of threaded rod 3 on which rod head 4 is provided.

FIG. 3*b* shows a cap 11 of a fuel injector which has been removed from the fuel injector 12 shown is FIG. 3*c*. The fuel injector 12 shown in FIG. 3*c* is a typical hollow metal rod whose threads 13 are exposed after removal of cap 11 from the threaded portion of that fuel injector.

In operation, the component parts of my fuel injector remover are assembled together as shown in FIG. 2. The threaded portion of threaded rod 3 is inserted into and through first lug nut 6 so that rod head 4 rests on shelf 5 within first lug nut 6. Thereafter, threaded rod 3 is inserted through channel 2 in support member 1, and thence through washer 8 and thrust bearing 9 to expose its threads to second lug nut 10. Second lug nut 10 in then screwed onto and over the threads of threaded rod 3.

The stuck fuel injector 12 is prepared for removal by unscrewing cap 11 to expose the threaded portion of fuel injector 12. After the fuel injector is prepared for removal, the threads 7 along a portion of the interior of first lug nut 6 are screwed onto the exposed, threaded portion of fuel injector 12. When threads 7 are secured on fuel injector 12, but not tightly enough to prevent free movement of rod head 4 on shelf 5, second lug nut 10 is tightened until the leg bases 14 of support member 1 rest against the cylinder head. Keeping the centerline of threaded rod 3 substantially coextensive with the centerline of stuck fuel injector 12, second lug nut 10 is tightened further to gently extract stuck fuel injector 12 from the cylinder head.

I claim:

1. A device for removing a fuel injector from the cylinder head of an internal combustion engine that comprises a support member having a channel passing through said support member, a threaded rod having two ends that includes a first lug nut secured onto one end of said rod in a manner that supports said first lug nut by said rod while allowing said rod to turn without turning said first lug nut, said threaded rod inserted through said channel in said support member, a second lug nut secured onto the other end of said rod in a manner that prevents removal of said rod from said channel in said support member, and said first lug nut provided with internal threads capable of mating with the threads of a fuel injector.

* * * * *